Patented Apr. 21, 1942

2,280,723

UNITED STATES PATENT OFFICE 2,280,723

PURIFICATION OF STARCHES

Thomas John Schoch, New York, N. Y., assignor to Corn Products Refining Company, New York, N. Y., a corporation of New Jersey No Drawing. Application March 18, 1939, Serial No. 262,781

8 Claims. (Cl. 127—71)

This invention relates to the purification of starch, for example corn (maize) starch, of its fatty acid content or the major portion thereof.

Starch treated according to the invention is characterized, in comparison with the usual refined commercial starches, by increased whiteness, decrease in non-starch taste and odor, improved free-flowing property, that is decreased tendency to pack, easier wetting by water and improved clarity and whiteness of its paste when gelatinized in hot water.

The primary object of the invention is to provide a process for effecting the removal of fatty acids from starches whereby a purified startch is obtained having the characteristics above noted.

The invention is applicable to all starches containing fatty acids such as corn starch, wheat starch, rice starch, and tapioca starch.

When a starch, corn starch for example, is thoroughly refined by the usual methods so that all or substantially all of the other impurities have been removed it will contain a considerable quantity of fatty acids, for example between 0.6% and 0.85% by weight.

Efforts have been made over a considerable period of time to extract this fatty acid content by the use of various solvents, particularly hydrocarbon solvents such as carbon tetrachloride, benzene, naphtha and petroleum ether. The failure of these efforts, and also other considerations, have led to the belief common among chemists that the fatty acids in starch are chemically combined with the starch molecule.

It is possible to remove fatty acids from starch by hydrolyzing the starch with heat in a water suspension containing acid; but this involves modification of the starch, for example conversion of the starch into sugar. In the ordinary method of converting starch to dextrose the conversion of the starch by acid hydrolysis releases the fatty acids which are usually removed from the converted liquor by centrifuging, or otherwise, and form what is known as "refinery mud."

The theory that fatty acids in starch are chemically combined with the starch molecule has been found by the present applicant to be erroneous; and, in fact, the present invention is based upon the discovery that the fatty acids in starch are not chemically combined with the starch (which if true would necessitate modification of the starch molecule in order to effect their removal) but that these substances are in the starch in a chemically uncombined but intimately dispersed or blended state so that they may be removed, to a very large extent at least, by the use of solvents, if the proper solvents are employed, without in any other way affecting the character of the starch.

While the fatty acids are not chemically combined with the starch, they are not present as an ordinary impurity but are contained within the starch granules distributed in and blended in a very intimate manner with the carbohydrate substance. It is for this reason that the common carbohydrate fatty acid solvents are not effective for the removal of fatty acids from starch. It has been discovered by the present applicant that fatty acids may be removed from starch by ordinary extraction methods provided fatty acid solvents of the hydrophilic type are used, that is, solvents which are miscible with water and therefore capable of penetrating the starch granules and all solvents of this class may be employed with greater or less effect.

Examples of hydrophilic fatty acid solvents are those containing the hydroxy (OH) group, such as methyl alcohol, those containing the carbonyl (CO) group such as diacetone, and those containing the amino ($NH_2$) group, such as di-ethyl amine.

The solvents which in practice have been found most effective are methyl alcohol, methyl cellosolve (methylene glycol monomethyl ether) and dioxan.

Other possible solvents besides those mentioned above are ethyl alcohol, butyl carbitol (diethylene glycol monobutyl ether), acetone, di-methylamine, triethanolamine, isopropyl alcohol, and tertiary amyl alcohol.

Dioxan in the anhydrous state is ineffective. A certain amount of water should be added to it; and in the case of other solvents the penetration of the solvent into the granule, and consequently the effectiveness of the solvent in extracting fatty acids, is promoted by the addition of small proportions of water.

As ordinary starches contain water the starch water content is a factor in determining whether and to what extent the solvent usually should be in an aqueous state. The effectiveness of the extraction depends in some cases on the percentage of water in the solvent.

Any suitable extraction method may be used such as hot reflux extraction, which is preferred, hot or cold digestion followed by filtration or hot or cold percolation.

The following are specific examples of the reduction of the invention to practice:

*Example 1.*—330 parts by weight of 85% methyl alcohol is mixed in a retort having a reflux condenser with 150 parts of corn starch, having the usual water content of about 12%–15%, and the material is heated and refluxed for one hour. The material is then filtered and the starch refluxed with 330 parts of ethyl alcohol for one hour and then filtered. The material is then refluxed with 330 parts of 85% methyl alcohol for one hour, filtered and dried in a vacuum for four hours.

By this process starch containing 0.84% of fatty acids has its fatty acid content reduced to 0.25%.

The quantity of alcohol must be sufficient to suspend the starch. The amount of water in the alcohol may vary from 0 to 50%. However, an 85% methyl alcohol appears to give the best results. If the water is substantially more or less than this the quantity of fatty acids extracted is reduced. The refluxing times may vary from one-half hour to three hours.

*Example 2.*—150 parts of starch is suspended in 330 parts of 80% dioxan and refluxed for one hour and then filtered. This process is repeated twice with like quantities of fresh solvent and the purified starch finally dried in vacuum for four hours.

With this operation the fatty acid content may be reduced from 0.84% to 0.12%.

The amount of water in the dioxan may range from 10% to 40% and the refluxing times may vary from one-half hour to three hours.

It will be understood that these examples are merely typical and informative. The invention is not limited to the particular operating data given. The intention is to cover all equivalents and also all modifications of operating procedures within the scope of the appended claims.

I claim:

1. Process of purifying starch of its fatty acids without hydrolysis of the starch which comprises extracting said fatty acids with a water miscible fatty acid solvent capable of penetrating said starch granules so as to dissolve the fatty acids therein.

2. Process of purifying starch of its fatty acids without hydrolysis of the starch which comprises extracting the fatty acids with an aqueous hydrophilic fatty acid solvent capable of penetrating said starch granules so as to dissolve the fatty acids therein.

3. Process of purifying starch of its fatty acids without hydrolysis of the starch which comprises subjecting the starch to repeated extractions, with intervening filtrations, by means of a fatty acid solvent miscible with water so as to be capable of penetrating the starch granules to dissolve the fatty acids therein.

4. Process of purifying starch of its fatty acids without hydrolysis of the starch which comprises suspending the starch in a hydrophilic fatty acid solvent capable of penetrating the starch granules to dissolve the fatty acids therein, heating and refluxing the material and filtering the same to remove the solvent and fatty acids.

5. Process of purifying starch of its fatty acids without hydrolysis of the starch which comprises suspending 150 parts by weight of starch in 330 parts of 85% methyl alcohol; heating and refluxing for about one hour; filtering and removing the solvent; refluxing the starch mixed with 330 parts of ethyl alcohol, and filtering the material to remove the solvent; mixing the starch with 330 parts of 85% methyl alcohol; refluxing for about one hour; and filtering and drying the material.

6. Process of purifying starch of its fatty acids without hydrolysis of the starch which comprises suspending 150 parts by weight of starch in 330 parts of dioxan containing about 20% of water; refluxing for about an hour; filtering the material to remove the solvent; and twice repeating the refluxing with fresh dioxan as solvent, filtering the material between said operations.

7. Process of purifying starch of its fatty acids which comprises extracting the fatty acids from the starch granules with aqueous alcohol.

8. Process of purifying starch of its fatty acids which comprises extracting the fatty acids from the starch granules with aqueous dioxan.

THOMAS JOHN SCHOCH.